(12) United States Patent
Gießen et al.

(10) Patent No.: US 10,870,243 B2
(45) Date of Patent: Dec. 22, 2020

(54) METHOD AND DEVICE FOR PRODUCING MICROSTRUCTURES ON OPTICAL FIBERS

(71) Applicants: BADEN-WÜRTTEMBERG STIFTUNG gGmbH, Stuttgart (DE); Nanoscribe GmbH, Eggenstein-Leopoldshafen (DE)

(72) Inventors: Harald Gießen, Marnheim (DE); Michael Thiel, Karlsruhe (DE); Timo Gissibl, Leonberg (DE)

(73) Assignees: BADEN-WÜRTTEMBERG STIFTUNG gGmbH, Stuttgart (DE); Nanoscribe GmbH, Eggenstein-Leopoldshafen (DE)

( * ) Notice: Subject to any disclaimer, the term of this patent is extended or adjusted under 35 U.S.C. 154(b) by 256 days.

(21) Appl. No.: 15/765,914

(22) PCT Filed: Oct. 7, 2016

(86) PCT No.: PCT/EP2016/001686
§ 371 (c)(1),
(2) Date: Jun. 11, 2018

(87) PCT Pub. No.: WO2017/059960
PCT Pub. Date: Apr. 13, 2017

(65) Prior Publication Data
US 2018/0281324 A1    Oct. 4, 2018

(30) Foreign Application Priority Data
Oct. 7, 2015   (DE) .......... 10 2015 012 980

(51) Int. Cl.
B29D 11/00    (2006.01)
G02B 6/26    (2006.01)
(Continued)

(52) U.S. Cl.
CPC ...... *B29D 11/00663* (2013.01); *B29C 64/135* (2017.08); *B29D 11/00951* (2013.01);
(Continued)

(58) Field of Classification Search
CPC ........ B29D 11/00663; B29D 11/00951; B29C 64/135; G02B 6/262; B33Y 10/00; B33Y 30/00; B33Y 50/02
See application file for complete search history.

(56) References Cited

U.S. PATENT DOCUMENTS
5,858,475 A    1/1999   Chiu

FOREIGN PATENT DOCUMENTS
CN    101424880 A    5/2009
CN    201345033 Y    11/2009
(Continued)

OTHER PUBLICATIONS

International Search Report issued in International Application No. PCT/EP2016/001686 dated Jan. 31, 2017.
(Continued)

*Primary Examiner* — Mathieu D Vargot
(74) *Attorney, Agent, or Firm* — Quinn IP Law

(57) ABSTRACT

The invention relates to a method and a device for producing at least one microstructure (5) on an axial end (1a) of an optical fiber (1). The method comprises the following steps: —providing (S10) the optical fiber (1); —wetting (S20) the axial end (1a) of the optical fiber (1) with photoresist (2); —orienting (S30) the optical fiber (1) and a writing beam of a 3D printer with respect to one another; —forming (S40) the at least one microstructure (5) by exposing the photoresist (2) to light with the aid of the 3D printer.

21 Claims, 3 Drawing Sheets

(51) Int. Cl.
    *B33Y 10/00*     (2015.01)
    *B33Y 30/00*     (2015.01)
    *B33Y 50/02*     (2015.01)
    *B29C 64/135*     (2017.01)

(52) U.S. Cl.
    CPC .............. *B33Y 10/00* (2014.12); *B33Y 30/00* (2014.12); *B33Y 50/02* (2014.12); *G02B 6/262* (2013.01)

(56) References Cited

FOREIGN PATENT DOCUMENTS

| | | | |
|---|---|---|---|
| CN | 102649314 A | 8/2012 | |
| CN | 104959730 A | 10/2015 | |
| EP | 2492085 A1 | 8/2012 | |

OTHER PUBLICATIONS

Melissinaki Vasileia et al., Fiber endface Fabrry-Perot vapor microsensors fabricated by multiphoton polymerization technique, Advanced Fabrication Technologies for Micro/Nano Optics and Photonics VIII, Proceedings of SPIE, vol. 9374, Mar. 13, 2015, pp. 93740D-1-93740D-8.

M. Kowalczyk et al., Optical microstructures fabricated with direct laser writing technique, Latvian Journal of Physics and Technical Sciences, vol. 51, No. 5, Dec. 15, 2014, pp. 4-13.

Cojoc G. et al., Optical micro-structures fabricated on top of optical fibers by means of two-photon photopolymerization, Microelectronic Engineering, vol. 87, No. 5-8, Dec. 16, 2009, pp. 876-879.

Henry E. Williams et al., Fabrication of three-dimensional microphotonic structures on the tip of optical fibers using SU-8, Optics Express, vol. 19, No. 23, Oct. 27, 2011, pp. 22910-22922.

METHOD AND DEVICE FOR PRODUCING MICROSTRUCTURES ON OPTICAL FIBERS

The invention relates to a method and a device for producing microstructures, in particular micro-optical components, on optical fibers or glass fibers.

Optical waveguides or fiber optic cables are used in various fields in a variety of ways. As examples of the use of fiber optic cables, communications engineering, material processing, medicine, measurement technology, and lighting of devices or buildings can be mentioned. For example, fiber optic cables in the field of medicine can be used for lighting and imaging purposes, inter alia, in microscope lighting, light-guiding cables and image guides in endoscopes.

Depending on the field of application, it is necessary to combine the glass fiber or fiber optic cables with further optical elements. For example, a lens can be placed on a glass fiber in order to send light through the glass fiber and then through the lens. Here, it is possible, for example, to modify the wavefront and/or the intensity distribution and/or to influence the polarization. For many applications, for example for endoscopy, miniaturization is of decisive importance as well, so that it is necessary to provide microstructures or micro-optical components in combination with glass fibers.

Micro-optical components having sizes of less than 1-3 mm can be produced by precision microinjection molding methods in combination with ultra-precision machining or by pure ultra-precision machining. However, these components are not intended for use on glass fibers.

Microinjection molding methods are highly restricted in the production of optical microcomponents. Among other things, special tools are necessary in order to initially melt only a small volume homogeneously and subsequently supply it to the injection tool. In addition, the optical design has to be adapted to the tools, so that the components can subsequently be removed again from the injection molding machine without damage.

Subsequent finishing, such as gate separation by milling or grinding, also has to be non-destructive and without contamination. Furthermore, the production of the negative mold required for the injection molding process is limited due to the small object dimensions by means of erosion, milling or grinding by the usual tool sizes. This problem also occurs in the manufacture of micro-optical components by ultra-precision machining. Due to the small dimensions of the object, handling during placement in receptacles or magazines is also made more difficult. Among other things, the low weight and electrostatic effects also play a negative role here.

Joining of a micro-optical component produced by a conventional method with the optical fiber is a further problem. Since, due to the small dimensions of the fiber and of the micro-optical components, the most accurate joining or alignment of the parts to be joined is required, additional and complex adjustment steps are conventionally necessary for this purpose.

It is therefore an object of the present invention to provide a method and a device for improved, i.e. simple, reproducible and precise production of microstructures, in particular of micro-optical components, on optical fibers or glass fibers.

This object is solved by the subject matters of the independent claims. Advantageous embodiments are subject of the subclaims.

A first independent aspect for achieving the object relates to a method for producing at least one microstructure on an axial end of an optical fiber or glass fiber, comprising the steps of:
providing the optical fiber;
wetting the axial end of the optical fiber with photoresist;
mutually, in particular with submicrometer accuracy, aligning the optical fiber or the axial end or a fiber core of the optical fiber and a writing beam of a 3D printer; and
forming the at least one microstructure by exposing the photoresist with the aid of the 3D printer.

A microstructure comprises in particular a micro-optical structure and/or a micro-optical component, such as a microlens. The microstructure preferably has dimensions in the range of 2 µm to 1 mm.

Where the term "fiber" is used in this description, it always means an optical fiber or glass fiber.

An "optical fiber" as used in this description in particular means an optical waveguide or a dielectric waveguide or light-guiding cable, which is suitable for transmitting light. Here, the light is guided in the optical fiber, which is made, for example, of quartz glass or plastics (polymeric optical fiber).

Such optical fibers or optical waveguides are also often referred to as fiber optic cables, wherein a plurality of fibers or optical waveguides are typically bundled therein, which are mechanically reinforced for protection and stabilization of the individual fibers.

An optical fiber or optical waveguide is made up of concentric layers. In the center of an optical fiber there is located a light-carrying core that is surrounded by a cladding. In the case of index-guided fibers, the refractive index of the cladding is smaller than the refractive index of the core. An optical fiber may have a diameter of 100 µm to 1 mm.

However, the term "optical fiber" as used in this description is not restricted to conventional index-guided fibers only, but also comprises any other type of optical fiber, such as "hollow-core photonic bandgap fibers", which conduct light via the photonic bandgap effect. The periodic structure of the air spaces in the cladding of such a fiber generates a photonic bandgap, so that light having frequencies within the bandgap cannot propagate through the cladding, but can propagate in the fiber core. In contrast to index-guided fibers, in hollow-core photonic bandgap fibers, there is no condition that the refractive index of the core region must be greater than that of the cladding. A hollow core photonic bandgap fiber may be a special embodiment of a hollow core fiber, the core of which is preferably filled with air. The core of such a fiber has, in particular, no filling with a special medium that is different from air.

The core and/or cladding of an optical fiber may be surrounded by further protective layers, in particular made of plastic. Depending on the respective application, the core may have a diameter of a few micrometers up to a few hundred micrometers. If the optical fiber has a hard or fixed core, it is an optical hard-core fiber or solid-core fiber. If, on the other hand, the core of the optical fiber has a cavity, it is an optical hollow-core fiber or capillary fiber. The core or cavity of an optical hollow-core fiber may be filled with a gas or a liquid. For example, hollow-core fibers may be filled with liquids having very good non-linear optical properties for white light/supercontinuum generation, for stimulated Raman scattering or for medium infrared generation.

An axial end of an optical fiber is to be understood as an axial end portion or axial end region of the fiber. An optical fiber basically has two axial ends, i.e. a first and a second axial end. In the context of this invention, the first axial end is understood to be the axial end of the fiber that is to be provided with a microstructure and that is wetted with photoresist for this purpose. The first axial end of the fiber is thus the axial end of the fiber facing the 3D printer or the writing beam of the 3D printer during the writing process or during the exposure of the photoresist. The second axial end of the fiber is the axial end of the fiber opposite the first axial end of the fiber, and thus the axial end facing away from the 3D printer or the writing beam of the 3D printer during the writing process or during the exposure of the photoresist.

Wetting of the axial end of the optical fiber with photoresist may also be referred to as resist coating.

The photoresist used may be, in particular, a so-called dip-in lithography photoresist alone or in combination with other photoresists. Preferably, solvent-free, in particular ultraviolet-sensitive photoresists, are used, which do not attack or dissolve the gluing of an objective of the 3D printer. When solvent-free photoresists are used, no further baking processes are required, as are usually common in lithography. This is particularly advantageous due to the small dimensions of the microstructures to be produced, since a controlled outgassing of solvent for homogeneous material properties could be controlled only with great difficulty. Preferably, transparent photoresists are used for producing optics. In principle, however, it is also possible to use absorbing or reflecting materials, provided that the photoresist for the writing operation, i.e. prior to polymerization of the photoresist, is substantially transparent to the writing beam or laser beam.

For example, the following photoresists can be used: Nanoscribe IP-S, Nanoscribe IP-Dip, and/or Micro resist technology OrmoComp.

After application of the photoresist, mutual, in particular with submicrometer accuracy, aligning of the optical fiber or the axial end of the optical fiber wetted with the photoresist and the writing beam of the 3D printer takes place.

The microstructure is applied to the optical fiber or an axial end of the optical fiber by means of a 3D printing technique, i.e. by means of a 3D printer or a 3D printing method. The 3D printer or 3D printing method is preferably a 3D lithography system or 3D lithography method and in particular a 3D laser lithography system or 3D laser lithography method. As an example of a 3D printer or a 3D printing system, the commercially available 3D laser lithography system "Photonic Professional GT™" of Nanoscribe GmbH is mentioned, which is based on a two-photon polymerization of an UV-curing photoresist. It is understood that other 3D printers or other 3D printing methods can also be used in principle.

After the alignment, the at least one microstructure is formed by exposing the photoresist with the aid of the 3D printer. In particular, the photoresist is exposed to a writing beam or laser beam of the 3D printer. The photoresist is a photosensitive substance, which changes its inner structure as a result of the exposure, i.e. by introducing electromagnetic radiation of a predetermined wavelength or in a predetermined wavelength range. In particular, the photoresist is hardened or polymerized at the exposed locations. Forming or writing of the at least one microstructure is performed preferably on the basis of a predetermined layout or design, which is provided or generated e.g. with a software of the 3D printer.

The term "forming" the at least one microstructure as used in this description comprises application, production, fabrication, exposure and/or writing, in particular lithographic writing of the at least one microstructure. In other words, the at least one microstructure is connected to the optical fiber or an axial end of the optical fiber. In particular, the at least one microstructure is designed in such a way that it is connected to the optical fiber in a fixed, i.e. non-detachable fashion.

With the method according to the invention, optical elements can advantageously be produced directly on an optical fiber with resolutions below one micron, which allow influencing of light. In particular, miniaturized combinations of different elements, such as diffractive, refractive or reflective elements can be produced. The shape of the individual optical elements can be selected almost arbitrarily, i.e. in particular also more complex structures without limitation to the optical design can be generated.

For example, with the method according to the invention, free-form microlenses can be produced directly on glass fiber ends, so that endoscopes with dimensions of less than 1 mm can be realized. Also, multi-lens refractive, reflective, or diffractive objectives can be fabricated directly on fiber ends. Likewise, free-form optics with non-symmetrical surfaces are possible, for example, to directly adjust the light distribution on a desired surface.

Since the production takes place directly on the optical glass fiber, handling of the microcomponents is very simple. In addition, since no negative mold is required, different optical designs can be produced without additional effort. Furthermore, complex optical designs, which also consist of several optical sub-elements, are possible.

The method according to the invention allows the production of optical structure sizes higher than 10 μm and with a resolution of 1 μm.

Since in the method according to the invention, optical components are directly fabricated on optical fibers, there is no need for later joining of the micro-optics to the fiber. This also applies, in particular, when the micro-optics are produced with a dip-in multiphoton laser lithography method, but has been produced on a conventional flat substrate.

In a preferred embodiment, wetting of the axial end of the optical fiber comprises immersing the axial end of the optical fiber into a photoresist reservoir.

Within the scope of the invention, it has been found that wetting or photoresist coating of the optical fiber by immersing the axial end of the optical fiber into a photoresist reservoir leads to homogeneous and reproducible results. Photoresist coating by spray or spin coating, which is only very limited or not possible at all for a fiber, can thus advantageously be avoided.

The photoresist reservoir may be a photoresist that is stored in an external vessel into which the fiber can be immersed. Preferably, however, the photoresist or the photoresist reservoir, into which the fiber is immersed, is located directly on the objective of the 3D printer. In other words, the photoresist is preferably first applied to the objective of the 3D printer. This photoresist applied to the objective is then advantageously used as a photoresist reservoir for immersion or coating of the end of the optical fiber to be written on.

Preferably, the optical fiber or the axial end of the optical fiber is moved or swiveled in the photoresist or photoresist reservoir. Alternatively or additionally, wetting of the axial end of the optical fiber comprises a treatment with ultrasound, i.e. placing the fiber or the axial end of the fiber into an ultrasonic bath. Further preferably, after immersion of the axial end of the optical fiber into the photoresist reservoir and/or into the ultrasonic bath, a predetermined time passes until the photoresist homogeneously surrounds the axial end of the fiber or the fiber end surface.

In this way, air inclusions and photoresist flows can advantageously be avoided.

In a further preferred embodiment, the mutual alignment of the optical fiber and the writing beam of the 3D printer is carried out by means of a light-emitting diode, in particular a laser diode. Preferably, the mutual alignment of the optical fiber and the writing beam of the 3D printer comprises coupling light, in particular by means of a light-emitting diode or a laser, into a second axial end of the optical fiber, i.e. into the axial end that is opposite to the axial end wetted with photoresist or that faces away from the 3D printer or the writing beam thereof during the writing operation.

The coupling of light into the optical fiber preferably takes place in such a way that the coupled-in light makes a fiber core of the optical fiber visible or recognizable on the end of the optical fiber to be machined or wetted with photoresist, in particular to an adjusting camera.

The coupled-in light makes it possible to illuminate the first axial end or an associated first fiber end surface to be machined, so that the light makes the fiber core visible or recognizable at the first axial end or at the first fiber end surface, in particular to an adjusting camera.

Alternatively or additionally, the mutual alignment of the optical fiber and the writing beam of the 3D printer comprises a recognition of a fiber edge or a fiber border.

In this way, with the method according to the invention, in comparison to conventional methods, a high-precision alignment, i.e. with submicrometer accuracy, is possible.

Such an alignment during a later joining of a conventionally produced micro-optical component to the optical fiber could only be achieved with great difficulty. In a conventional method, at least additional adjustment steps would be necessary in order to realize a comparably good alignment. In the method according to the invention, however, such additional adjustment steps are superfluous.

In a further preferred embodiment, the mutual alignment of the optical fiber and the writing beam of the 3D printer further comprises determining the position of a radial center point of the optical fiber or the fiber core and defining the determined position as a coordinate zero point of a coordinate system of the 3D printer. The determination of the position of a radial center point of the optical fiber can be carried out, for example, on the basis of the light coupled into the second axial end of the fiber.

Preferably, by means of the light beam coupled into the second end of the optical fiber, a fiber end surface associated with the first axial end is projected onto an adjusting camera and a coordinate zero point of the 3D printer is substantially placed into a fiber core center point, in particular with submicrometer accuracy. In other words, the fiber core center point of the optical fiber is preferably used as a coordinate zero point, in particular with an accuracy in the submicrometer range.

In a further preferred embodiment, the alignment of the optical fiber and the writing beam of the 3D printer is carried out using an adjusting camera and/or using an image recognition algorithm, in particular at least partially automatically.

Alternatively or additionally, the alignment of the optical fiber and the writing beam of the 3D printer is performed using an inverse modified microscope, which can be part of the 3D printer. An inverse microscope is understood to mean a microscope in which the objective or objectives is/are arranged and/or attached below the specimen or the fiber to be written on. The term "modified" means that a writing beam or laser beam is coupled into the microscope.

With the use of an inverse modified microscope, as is also the case with the commercial two-photon lithography system of Nanoscribe GmbH, the element to be written on and the object to be produced can be aligned with respect to one another with nanometer accuracy, in particular by means of a piezo- and/or mechanical displacement unit.

In a further preferred embodiment, the formation of the at least one microstructure comprises a partial polymerization of the photoresist by means of a three-dimensional structure, in particular multiphoton, laser lithography. The partial polymerization of the photoresist is preferably carried out by varying or changing or moving a laser focus, in particular by means of a galvo scanning head.

The galvo scanning head comprises one or more movable mirrors and makes sure that the laser is scanned over the writing field. Here, the laser beam is deflected by the movement of the mirrors. With the use of a galvo scanning head, as used for example also in the Nanoscript Professional GT, not the object but the writing laser focus is moved for each position. As a result, shorter production times and advantages in the production accuracy can be achieved in contrast to the production by moving the element to be written to by means of a mechanical or piezo displacement table.

In a further preferred embodiment, the formation of the at least one microstructure further comprises removing residual, i.e. non-exposed or polymerized photoresist, in particular with the aid of a solvent.

A further independent aspect for achieving the object relates to a device for producing at least one microstructure on an axial end of an optical fiber, comprising
    a holder for arranging and holding or fixing or receiving the optical fiber;
    a 3D printer for exposing a photoresist applied to an axial end of the optical fiber; and
    an alignment unit for mutually aligning the optical fiber arranged in the holder or an axial end of the optical fiber wetted with a photoresist and a writing beam of the 3D printer.

In a preferred embodiment, the alignment unit comprises a light source, for example a light-emitting diode or a laser, for coupling light into a second axial end of the optical fiber.

Alternatively or additionally, the alignment unit comprises a displacement unit, in particular a piezo- and/or mechanical displacement unit, for displacement of the optical fiber arranged in the holder, in particular with submicrometer accuracy.

Alternatively or additionally, the alignment unit comprises an adjusting camera for determining and/or checking the mutual alignment of the optical fiber arranged in the holder and of the writing beam of the 3D printer.

Alternatively or additionally, the alignment unit comprises a fiber edge detection device for detecting a fiber edge. The fiber edge detection device preferably comprises a fiber edge lighting device, with which the first axial end of the fiber can be illuminated. In addition, the fiber edge detection device preferably comprises a fiber edge detection camera for capturing one or more images of the optionally illuminated first axial end of the fiber. The fiber edge detection camera may be the above-mentioned adjusting camera and/or an additional camera. The fiber edge may be identified manually with the aid of the image captured by the fiber edge detection camera. Preferably, however, the fiber edge detection device comprises a microprocessor or a computer which, with the aid of an image recognition algorithm, can detected the edge of the fiber on the basis of at least one image captured by the fiber edge detection camera.

In a further preferred embodiment, the 3D printer comprises an inverse modified microscope.

For the above-mentioned further independent aspect and in particular for preferred embodiments in this respect, the statements made above or below with respect to the embodiments of the first aspect also apply. In particular, the statements made above and below with respect to the embodiments of the respective other aspects also apply to an independent aspect of the present invention and for respective preferred embodinvents.

In the following, individual embodiments for solving the object are described by way of example with reference to the figures. Here, the individual described embodiments have, in part, features that are not absolutely necessary in order to carry out the claimed subject matter, which, however, provide desired properties in certain applications. Thus, embodiments that do not have all the features of the embodiments described below are also to be regarded as being disclosed by falling under the described technical teaching. Furthermore, in order to avoid unnecessary repetitions, certain features are mentioned only in relation to individual ones of the embodiments described below. It is pointed out that the individual embodiments are therefore to be considered not only individually but also in combination. On the basis of this combination, the skilled person will see that individual embodiments can be modified by incorporating individual or several features of other embodiments. It is pointed out that a systematic combination of the individual embodiments with individual or several features described with reference to other embodiments, may be desirable and expedient and therefore be considered and also regarded as being encompassed by the description.

DETAILED DESCRIPTION OF THE DRAWINGS

Figure 1:
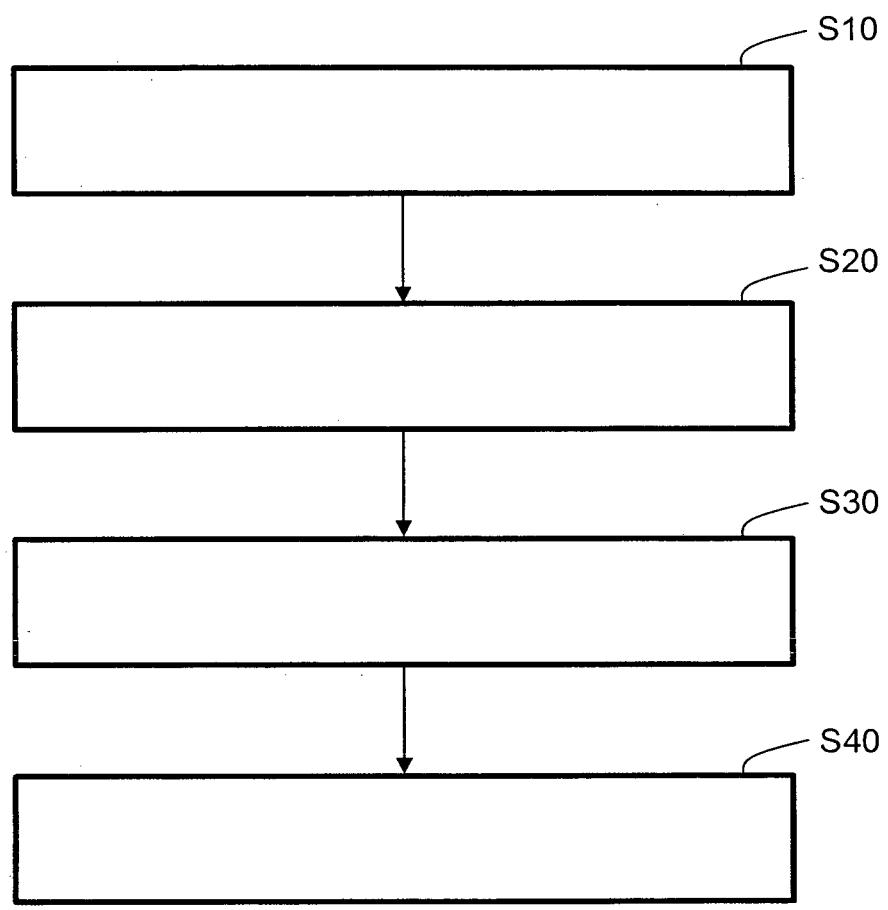
FIG. 1 shows a schematic flow chart of the method according to the invention.

FIG. 1 shows a schematic flow chart of the method according to the invention. In a first step S10, an optical fiber is provided. In a second step S20, a first axial end of the optical fiber is coated, i.e. wetted with a photosensitive substance or photoresist. In a third step S30, the optical fiber and a writing beam or laser beam of a 3D printer are mutually aligned. In a fourth step S40, the microstructure is formed by exposing the photoresist by means of a 3D printer.

The 3D printer is preferably based on three-dimensional multi-photon laser lithography. In particular, the 3D printer may be a 3D femtosecond laser lithography system, for example a "Photonic Professional GT™" of Nanoscribe GmbH. The technology for producing three-dimensional micro- and nanostructures in photosensitive materials is based on direct laser writing, i.e. a non-linear two-photon absorption process. Many photoresists that cure under the influence of UV light show a similar chemical reaction, when two photons from the near-infrared light spectrum are simultaneously absorbed. A sufficiently high light intensity, which can be provided by ultrashort pulse lasers, is necessary for this effect to occur. The laser light is focused into the photoresist and the two-photon polymerization is locally restricted to the region of the focus volume.

The three-dimensional multi-photon laser lithography is used according to the invention in order to produce optical micro-elements directly on optical fibers. Here, the components are constructed layer by layer directly on the carrier material by means of curing of a photoresist by two-photon absorption. In this way, it is possible to realize any optical design. With the aid of holding structures additionally printed or written with the 3D printer and, which are integrated into the design or layout, it is thus also possible to produce complex structures, for example structures with cavities. The holding structures may serve to hold certain structures or optics. The non-cured photoresist can be rinsed out after exposure with a solvent. The shape deviation is smaller than or equal to 1 μm.

In particular, step S30 can comprise illuminating the end of the fiber facing away from the 3D printer or the side of the fiber facing away from the 3D printer with a diode and subsequently aligning the optical fiber and the writing beam on the basis of the brightly shining fiber core on the side of the fiber facing the 3D printer. For this purpose, the side of the fiber facing the 3D printer does not have to be illuminated. The alignment of the optical fiber and the writing beam may be carried out manually by displacing the fiber with the aid of a piezo displacement table or a mechanical displacement table.

Alternatively or additionally, step S30 can comprise an alignment by means of detection of the fiber end surface or the fiber border, in particular with an image recognition algorithm or manually. To this end, the side of the fiber facing away from the 3D printer does not have to be illuminated, but it is sufficient to illuminate the side of the fiber facing the 3D printer and to observe it by means of a camera. The fiber end surface or the fiber edge can be captured by means of the camera and then the coordinate zero point of the 3D printer can be determined either by an automatic image recognition algorithm or manually.

By means of this method, the micro-optic can be positioned on an axial end or the core of the fiber with submicrometer accuracy. If only the fiber edge is detected without the core being illuminated by the second axial end of the fiber, the core can be assumed centrally in the center, which, however, can lead to errors in the case of fabrication inaccuracies of the fiber.

Figure 2:
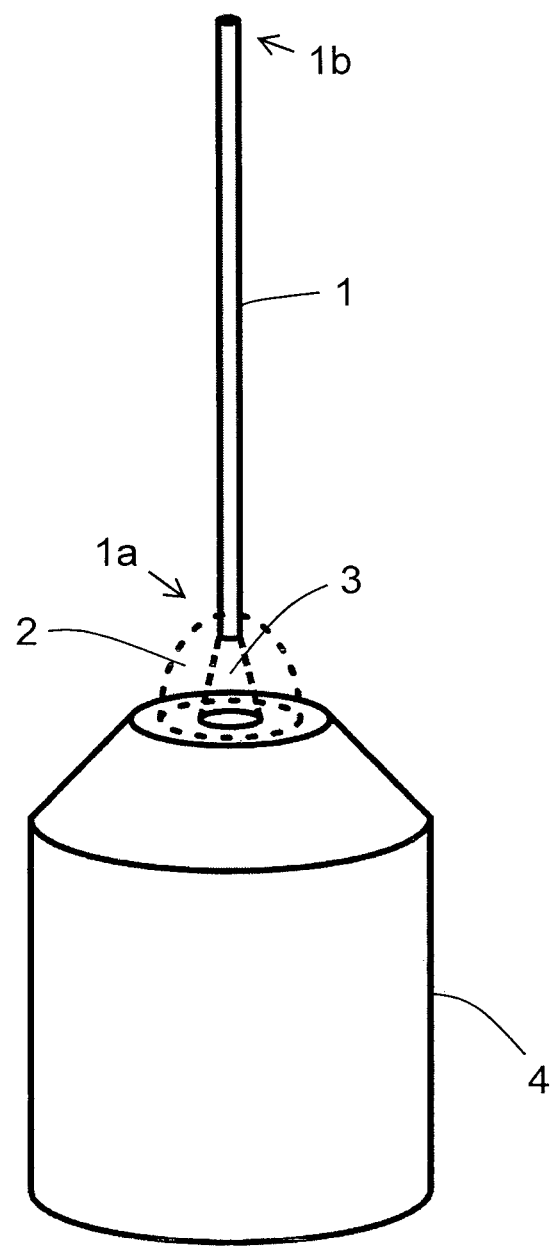
FIG. 2 shows a schematic sketch of the direct writing operation of a microstructure on an optical fiber according to a preferred embodiment of the method according to the invention or the device according to the invention.

FIG. 2 shows a schematic sketch of the direct writing operation of a microstructure on an optical fiber 1 according to a preferred embodiment of the method according to the invention or the device according to the invention. For this purpose, for reasons of simplicity, only one objective 4 of the 3D printer is shown in FIG. 2, with which a writing or laser beam can be focused to a predetermined position. The optical fiber 1 has two axial ends or end portions, namely a first end 1a onto which the microstructure is to be written or produced and which faces the 3D printer or the objective 4 of the 3D printer during the writing operation. The first end 1a of the optical fiber is thus the end of the fiber to be machined. Prior to the writing process, the first axial end 1a of the optical fiber 2 is wetted with photoresist 2 by immersing it in a photoresist reservoir. A second end 1b faces away from the 3D printer or the objective 4 of the 3D printer during the writing operation. In particular for the mutual alignment of the fiber and the writing beam of the 3D printer, light is coupled into the second end 1*b* by means of a light-emitting diode (LED) with submicrometer accuracy.

For exposing the photoresist 2 or writing the microstructure, the fiber 1 wetted with photoresist 2 is clamped into a holder and placed above a microscope or writing head of the 3D printer. By means of a light-emitting diode (not shown in FIG. 2), whose beam is coupled into the optical fiber 1 from the rear, i.e. via the second axial end 1*b*, there is an exact mutual alignment of the fiber 1 and the writing beam. By projecting the fiber end surface onto an adjusting camera (not shown in FIG. 2), the coordinate zero point can be placed in the fiber core center with submicrometer accuracy. After the writing process has been completed, the remaining photoresist 2, which has not been polymerized, is removed from the written fiber end 1*a* by a solvent.

The method may comprise the following steps:
i) immersion of the axial end of the optical fiber into the photoresist or the photoresist reservoir;
ii) wetting the fiber with photoresist to avoid air inclusions and photoresist flows by, inter alia
   a) the fiber is moved through the photoresist
   b) an ultrasonic bath is used and/or
   c) waiting
until the photoresist homogeneously surrounds the fiber end surface;
iii) mutual alignment of the solid-core fiber and the writing beam of the lithography system in order to place the coordinate zero point in the center point of the fiber core with submicrometer accuracy;
Here, the mutual alignment can be carried out by
a) illumination of the opposing fiber end surface, so that light makes the fiber core visible on the fiber end surface to be machined and thus enables an alignment of the fiber core and the writing beam by means of an adjusting camera,
and/or
b) detection of the fiber border and placing the coordinate zero point into the fiber center.
Both, i.e. the above-mentioned steps a) and/or b), can be carried out with the support of image recognition software.
iv) performing the 3D printing process or 3D writing process, in particular polymerization, in part(s), of the photoresist on the basis of a predetermined layout or design;
v) removing the residual photoresist, i.e. the photoresist that has not been polymerized, from the fiber end with the aid of a solvent.

In particular, the method can comprise one or more of the following steps:
preparing or coating of the axial end of the solid-core fiber with a photoresist;
clamping the solid-core fiber into a holder;
mutually aligning the solid-core fiber and the writing beam of the 3D printer by means of a light-emitting diode;
projecting a solid-core fiber end surface onto an adjusting camera, whereby the coordinate zero point can be placed in the center point or core center point of the solid-core fiber in particular with submicrometer accuracy;
carrying out the 3D printing process or 3D writing process, in particular polymerization, in part(s), of the photoresist on the basis of a predetermined layout or design;
removing residual photoresist, i.e. photoresist that has not been polymerized, from the end of the solid-core fiber with the aid of a solvent.

Coating or wetting of the axial end of the solid-core fiber with photoresist may also be carried out by coating a microscope objective of the 3D printer with photoresist and immersing the axial end of the optical fiber to be machined into the photoresist applied to the microscope objective, preferably by means of manual focus finding. In other words, a photoresist reservoir can be provided directly on the objective of the 3D printer. In order to avoid air bubbles, the fiber is preferably moved in the photoresist.

The method according to the invention expands the so-called dip-in multiphoton laser lithography, in which the carrier material, in this case an optical fiber, is directly immersed in a photoresist in order to produce structures with resolutions below one micrometer directly on the optical fiber. Due to the use of dip-in lithography, coating of photoresist by spray or spin coating is not necessary. Since the fiber end surfaces are not extended surfaces, only inhomogeneous and difficult-to-quantify results would be achieved with the cited methods due to the small surface. In particular, a dip-in lithography photoresist is used alone or in combination with other photoresists. The particular advantage is that solvent-free ultraviolet-sensitive photoresists are used, which do not attack or dissolve the bonding of the objective of the 3D printer. Since the photoresists used are solvent-free, they do not require any baking operations, as are usually common in lithography, which would lead to difficulties in the above-mentioned components due to the small size, since a controlled outgassing of the solvents for homogeneous material properties could be controlled only with great difficulty.

With the use of an inverse modified microscope, as is also the case with the commercial two-photon lithography system of Nanoscribe GmbH, the element to be written on and the object to be produced can be aligned with respect to one another with nanometer accuracy by means of a piezo- and/or mechanical displacement unit. With the use of a galvo scanning head, as used for example also in the Nanoscript Professional GT, not the object but the writing laser focus 3 is moved for each position. In this way, shorter production times and advantages in the production accuracy can be achieved in contrast to the production by moving the element to be written on by means of a piezo displacement table.

As shown in FIG. 2, the objective 4 of the 3D printer preferably immerses in the photoresist 2 applied to the first axial end 1*a* of the optical fiber 1 for the writing process. The photo-resistive substance or photoresist 2 is thus also advantageously used as an immersion medium. In this way, with increasing writing depth, additional aberrations can be reduced or avoided and thus the writing accuracy, in particular during the production of higher structures, for example structures having a height of >10 µm, can be improved.

Figure 3:
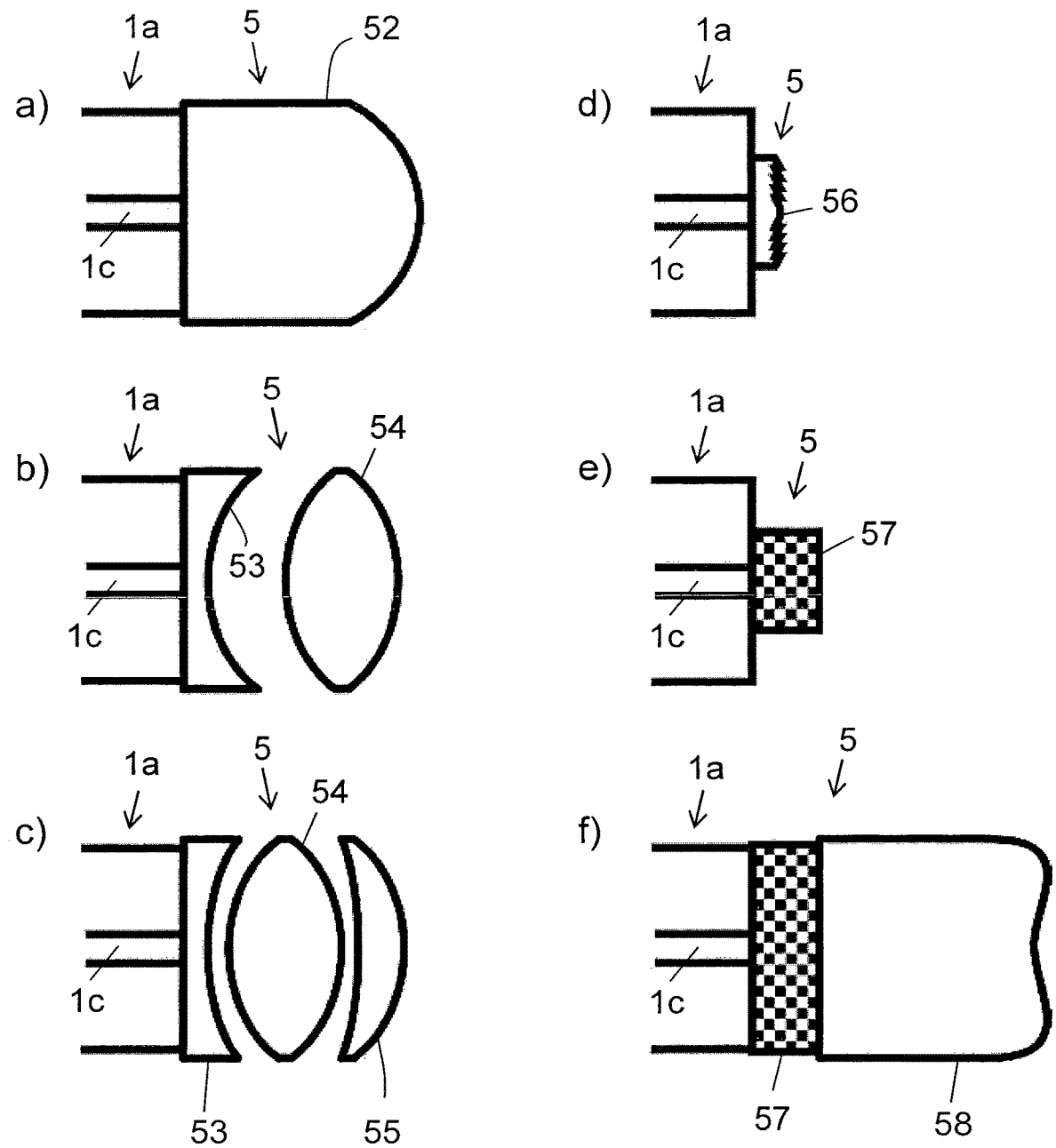
FIG. 3 shows schematic sketches of exemplary microstructures, which can be produced by means of the method according to the invention or the device according to the invention on an optical fiber.

FIG. 3 schematically illustrates exemplary microstructures 5, which can be produced on an optical fiber 1 or a first axial end 1*a* thereof by means of the method according to the invention or the device according to the invention. The microstructures 5 are all aligned relative to the axial end 1*a* of the optical fiber or the fiber core 1*c* with high precision, in particular with submicrometer accuracy. This results from the high-precision alignment of the axial end 1 an or the fiber core 1*c* of the optical fiber and the writing or laser beam of the 3D printer, which is possible with the present invention.

In the image a) of FIG. 3, the microstructure 5 is formed as a singlet lens or a plano-convex lens 52 and thus represents a collimation optics. In the image b) of FIG. 3, the microstructure 5 comprises a plano-concave lens 53 and a biconvex lens 54, which together form a doublet lens. In the image c) of FIG. 3, the microstructure 5 comprises a plano-concave lens 53, a biconvex lens 54 and concave-convex meniscus 55, which together form a triplet lens. In the image d) in FIG. 3, the microstructure 5 forms diffractive optics 56. In the image e) of FIG. 3, microstructure 5 is formed as a photonic crystal 57. In the image f) in FIG. 3, the microstructure is a combination of a photonic crystal 57 and free-form optics 58.

It is understood that FIG. 3 shows only a few examples of microstructures on optical fibers and in that any other microstructures or micro-optics can be produced with the method according to the invention or the device according to the invention.

LIST OF REFERENCE NUMERALS 1 optical fiber/glass fiber
1a first axial end or end portion of the optical fiber
1b second axial end or end portion of the optical fiber
1c fiber core
2 photosensitive substance/photoresist
3 laser focus
4 objective
5 microstructure/micro-optics
52 plano-convex lens
53 plano-concave lens
54 biconvex lens
55 concave-convex meniscus
56 diffractive optics
57 photonic crystal
58 free-form optics
S10 providing the optical fiber
S20 wetting the axial end of the optical fiber with photoresist
S30 mutually aligning the optical fiber and a writing beam of a 3D printer
S40 forming at least one microstructure by exposing the photoresist with the aid of the 3D printer

The invention claimed is:

1. A method for producing at least one microstructure on an axial end of an optical fiber, comprising the steps of:
providing the optical fiber;
wetting the axial end of the optical fiber with photoresist by immersing the axial end of the optical fiber into a photoresist provided on an objective of the 3D printer;
mutually aligning the optical fiber and a writing beam of a 3D printer;
forming the at least one microstructure by exposing the photoresist with the aid of the 3D printer.

2. The method according to claim 1, wherein the mutual alignment of the optical fiber and the writing beam of the 3D printer is carried out with submicrometer accuracy.

3. The method according to claim 1, wherein the mutual alignment of the optical fiber and the writing beam of the 3D printer is carried out by means of a light-emitting diode.

4. The method according to claim 1, wherein the mutual alignment of the optical fiber and the writing beam of the 3D printer comprises coupling light into a second axial end of the optical fiber.

5. The method according to claim 1, wherein the mutual alignment of the optical fiber and the writing beam of the 3D printer comprises detecting an edge of the optical fiber.

6. The method according to claim 1, wherein the mutual alignment of the optical fiber and the writing beam of the 3D printer comprises determining the position of a radial center point of the optical fiber and defining the determined position as a coordinate zero point of a coordinate system of the 3D printer.

7. The method according to claim 1, wherein the mutual alignment of the optical fiber and the writing beam of the 3D printer is carried out using an adjusting camera.

8. The method according to claim 1, wherein the mutual alignment of the optical fiber and the writing beam of the 3D printer is carried out using an image recognition algorithm.

9. The method according to claim 1, wherein wetting the axial end of the optical fiber comprises immersing the axial end of the optical fiber into a photoresist reservoir provided directly on the objective of the 3D printer, and wherein the photoresist reservoir contains the photoresist.

10. The method according to claim 1, wherein wetting the axial end of the optical fiber with photoresist comprises coating the objective of the 3D printer with the photoresist.

11. The method according to claim 1, wherein wetting the axial end of the optical fiber comprises moving the axial end of the optical fiber in the photoresist.

12. The method according to claim 1, wherein wetting the axial end of the optical fiber comprises a treatment with ultrasound.

13. The method according to claim 1, wherein forming the at least one microstructure comprises polymerizing the photoresist, at least in part, by means of three-dimensional laser lithography, and wherein the polymerizing of the photoresist is carried out, at least in part, by varying a laser focus.

14. The method according to claim 1, wherein forming the at least one microstructure further comprises removing residual photoresist.

15. A device for producing at least one microstructure on an axial end of an optical fiber, comprising:
a holder for arranging and holding the optical fiber;
a 3D printer for exposing a photoresist applied to an axial end of the optical fiber, the 3D printer comprising:
a writing beam;
an objective through which the writing beam passes;
a photoresist reservoir provided directly on the objective, the photoresist reservoir containing the photoresist and operative to allow the axial end of the optical fiber to be immersed in the photoresist;
an alignment unit for mutually aligning the optical fiber arranged in the holder and the writing beam of the 3D printer.

16. The device according to claim 15, wherein the alignment unit further comprises a light source for coupling light into a second axial end of the optical fiber.

17. The device according to claim 16, wherein the alignment unit is adapted to mutually align the optical fiber arranged in the holder and a writing beam of the 3D printer, with the aid of the light coupled into the second axial end of the optical fiber by the light source.

18. The device according to claim 15, wherein the alignment unit further comprises a displacement unit for displacing the optical fiber arranged in the holder.

19. The device according to claim 15, wherein the alignment unit further comprises an adjusting camera for determining and/or checking the mutual alignment of the optical fiber arranged in the holder and the writing beam of the 3D printer.

20. The device according to claim 15, wherein the alignment unit further comprises a fiber edge detection device for detecting an edge of the optical fiber.

21. The device according to claim 15, wherein the 3D printer comprises an inverse modified microscope.

* * * * *